(12) United States Patent
Surico et al.

(10) Patent No.: US 7,302,518 B2
(45) Date of Patent: Nov. 27, 2007

(54) METHOD AND SYSTEM FOR MANAGING A SUSPEND REQUEST IN A FLASH MEMORY

(75) Inventors: Stefano Surico, Milan (IT); Simone Bartoli, Cambiago (IT); Monica Marziani, Milan (IT); Luca Figini, Lomazzo (IT)

(73) Assignee: Atmel Corporation, San Jose, CA (US)

( * ) Notice: Subject to any disclaimer, the term of this patent is extended or adjusted under 35 U.S.C. 154(b) by 302 days.

(21) Appl. No.: 11/145,457

(22) Filed: Jun. 2, 2005

(65) Prior Publication Data

US 2006/0161727 A1 Jul. 20, 2006

(30) Foreign Application Priority Data

Jan. 20, 2005 (IT) .......................... MI2005A0063

(51) Int. Cl.
G06F 12/00 (2006.01)
(52) U.S. Cl. ..................................... 711/103; 711/168
(58) Field of Classification Search .................... None
See application file for complete search history.

(56) References Cited

U.S. PATENT DOCUMENTS

| | | | |
|---|---|---|---|
| 5,333,300 A | 7/1994 | Fandrich | |
| 5,355,464 A | 10/1994 | Fandrich et al. | |
| 5,713,006 A | 1/1998 | Shigeeda | |
| 5,737,748 A | 4/1998 | Shigeeda | |
| 5,737,764 A | 4/1998 | Shigeeda | |
| 5,805,501 A * | 9/1998 | Shiau et al. | 365/185.29 |
| 5,822,244 A * | 10/1998 | Hansen et al. | 365/185.11 |
| 5,923,838 A * | 7/1999 | Hongo | 714/42 |
| 5,937,424 A * | 8/1999 | Leak et al. | 711/103 |
| 5,940,861 A * | 8/1999 | Brown et al. | 711/154 |
| 6,081,870 A * | 6/2000 | Roohparvar | 711/103 |
| 6,148,360 A * | 11/2000 | Leak et al. | 710/260 |
| 6,189,070 B1 * | 2/2001 | See et al. | 711/103 |
| 6,201,739 B1 * | 3/2001 | Brown et al. | 365/185.29 |
| 6,212,646 B1 * | 4/2001 | Miwa et al. | 713/601 |
| 6,249,461 B1 * | 6/2001 | Choi et al. | 365/185.33 |
| 6,279,070 B1 * | 8/2001 | Jeong et al. | 711/103 |
| 6,552,935 B2 | 4/2003 | Fasoli | |
| 6,598,113 B2 * | 7/2003 | Roohparvar | 711/103 |
| 6,633,950 B1 * | 10/2003 | Brown et al. | 711/103 |
| 6,668,303 B2 | 12/2003 | Pio | |
| 7,032,081 B1 * | 4/2006 | Gefen et al. | 711/154 |
| 7,062,616 B2 * | 6/2006 | Sadhasivan et al. | 711/153 |
| 7,093,064 B2 * | 8/2006 | Dalvi et al. | 711/103 |
| 7,164,610 B2 * | 1/2007 | Kimura et al. | 365/195 |
| 2002/0035661 A1 * | 3/2002 | Roohparvar | 711/103 |
| 2002/0054537 A1 | 5/2002 | Pascucci | |
| 2002/0133740 A1 | 9/2002 | Oldfield et al. | |
| 2002/0133743 A1 | 9/2002 | Oldfield et al. | |
| 2002/0133744 A1 | 9/2002 | Oldfield et al. | |
| 2002/0184568 A1 | 12/2002 | Kurrasch | |

(Continued)

Primary Examiner—Kevin Verbrugge
(74) Attorney, Agent, or Firm—Sawyer Law Group LLP

(57) ABSTRACT

System and method for the managing of suspend requests in flash memory devices. The system includes a microcontroller performing a modify operation on a flash memory array, a memory coupled to the microcontroller and storing suspend sequence code for causing a suspension of the modify operation when executed by the microcontroller, and suspend circuitry that receives a suspend request from a user to suspend the modify operation and starts the execution of the suspend sequence code.

30 Claims, 3 Drawing Sheets

U.S. PATENT DOCUMENTS

| | | |
|---|---|---|
| 2003/0135350 A1 | 7/2003 | Cheston et al. |
| 2003/0163753 A1 | 8/2003 | Lu et al. |
| 2003/0172147 A1 | 9/2003 | Chang et al. |
| 2003/0187864 A1 | 10/2003 | McGoveran |
| 2003/0225967 A1 | 12/2003 | Kohli |
| 2004/0028003 A1 | 2/2004 | Diener et al. |
| 2004/0047324 A1 | 3/2004 | Diener |
| 2004/0088531 A1 | 5/2004 | Rothman |
| 2004/0213060 A1* | 10/2004 | Naso et al. .................. 365/201 |
| 2005/0024954 A1* | 2/2005 | Dalvi et al. .................. 365/199 |
| 2005/0078525 A1* | 4/2005 | Guo et al. ............. 365/185.28 |
| 2006/0027644 A1* | 2/2006 | Takashi et al. ............. 235/380 |

* cited by examiner

METHOD AND SYSTEM FOR MANAGING A SUSPEND REQUEST IN A FLASH MEMORY

FIELD OF THE INVENTION

The present invention relates to flash memory devices and similar non-volatile electronic devices, and more particularly to suspend requests in flash memory devices.

BACKGROUND OF THE INVENTION

Flash memory devices are convenient electronic memory devices used in a wide variety of applications. A flash memory device offers non-volatile storage of data, and also allows the data to be programmed into the memory and erased from the memory multiple times, thus enabling a multitude of flexible applications and uses.

Recent flash memory devices include an embedded method or algorithm to execute all modify operations of the flash memory, implemented by code stored in a read-only memory (ROM) and executed by a microcontroller. The modify operations include such operations as programming the flash memory with data, erasing data from the flash memory, etc. Some of the modify operations require long execution times due to the physical structure of the flash memory cells and due to the organization of the cell array. For these reasons, a feature required in flash memory devices is suspension of the longer modify operations, such as program or erase, for a particular length of time to allow a user to immediately access the flash memory. For example, when the user needs to read some array locations in the flash memory while one of the long modify operations is going on, the user can issue a suspend request (command) to the flash memory via a command interface, such as an input/output (I/O) pad of the flash memory.

The suspend command is decoded by the command interface (microcontroller) and, when the suspension of the modify operation is completed within a predetermined amount of time, the flash memory is allowed to be accessed for the read operations needed by the user (or another modify operation can be performed for the user). After the user's operations are complete, a resume command causes the interrupted modify operation to resume at the point where it was suspended, and to terminate correctly as appropriate for that operation.

In typical flash memories, a user's suspend request is managed in a software mode, i.e., using software code that the embedded method or algorithm can implement. In most flash memory implementations, when a suspend request occurs during a modify operation, a flag in a register is set. The embedded software code, using query instructions, checks if a suspend request has been issued from the user by checking or testing that register. After a query, if the register flag indicates that a suspend request has been issued, the embedded software code requests a jump to a particular code sequence that is a suspend sequence. The suspend sequence suspends the modify operation by switching off all charge pumps and high voltages used for running the modify operation and saves the configuration (such as state variables and timing parameters) that are used when the modify operation is resumed.

The software query of the flag described above must be executed periodically to check the register and determine whether a suspend request has occurred. The number of queries, i.e. the amount of time between queries, can be determined based on a predefined time characteristic for the flash memory, called "time to suspend." This is the maximum amount of time allowed from a suspend request to the completion of the suspension (interruption of the modify operation), after which the user's access is allowed. To comply with the time to suspend, a query needs to be executed in software code at a minimum rate. This requires a minimum number of query code instructions (compare operations) to be included in the embedded code, as well as an equivalent number of jump instructions (or similar instructions) that cause the code to jump to the branch of code storing the suspend sequence if the register flag is found to have been set.

Thus, the timing period between any two queries must guarantee that the time to suspend is met, requiring a relatively high number of query instructions. Furthermore, this number of instructions increases with an increase in complexity and length of the embedded software code. State-of-the-art flash memories have a high complexity in which the embedded code must execute several types of operations and features, including factory programs, enhanced factory programs, non-volatile protection of sectors, etc.; and multi-level flash memory devices require additional complex algorithms. It is important to be able to implement such features without increasing the length of the embedded code in an excessive way and to respect the required timing of the device. Thus, it is important to optimize and reduce as much as possible the embedded code length stored in the ROM or SRAM of the flash device so as to improve area efficiency, and, more importantly, to reduce the time duration required to execute code so that the timing requirements may be respected. For example, if the embedded code executes query instructions for 1,000 times during a modify operation, and the clock of the microcontroller executing the instructions is 100 nanoseconds, then 10 microseconds of extra time is expended simply for executing the queries. This drawback is even more evident in multi-level flash devices in which multiple bits can be stored in each cell, where the embedded code executes a very high number of repetitive instruction sequences. Adding new lines and features to the embedded code must necessarily increase the number of query instructions, since the time between queries must be such that the time to suspend of the device is followed.

Accordingly, what is needed is an apparatus or method for managing of a suspend request in a flash memory device without increasing the time duration needed to execute the embedded code and reducing the code length and the amount of storage needed for the code. The present invention addresses such a need.

SUMMARY OF THE INVENTION

The invention of the present application relates to the managing of suspend requests in flash memory devices. In one aspect of the invention, a system for managing a suspend request in a flash memory includes a microcontroller performing a modify operation on a flash memory array, a memory coupled to the microcontroller and storing suspend sequence code for implementing a suspend sequence to cause a suspension of the modify operation when executed by the microcontroller, and suspend circuitry coupled to the microcontroller and to the memory, wherein the suspend circuitry receives a suspend request from a user to suspend the modify operation, and wherein the suspend circuitry starts the execution of the suspend sequence code.

In another aspect of the invention, a method for managing a suspend request in a flash memory includes receiving a suspend request signal from a user to suspend a modify operation on a flash memory array, latching the suspend request signal until the modify operation can be suspended without causing errors in the modify operation, and suspending the modify operation by executing suspend sequence code stored in a memory.

In another aspect of the invention, a method for managing a suspend request in a flash memory includes executing embedded software code instructions from a memory in the flash memory to implement a modify operation on a flash memory array, receiving a suspend request from a user to suspend the modify operation, and suspending the modify operation using hardware suspend circuitry and without executing software code instructions that check whether the suspend request was received.

The present invention provides a system and method that permits correct and efficient management of a suspend requests in a flash memory device during modify operations, without the use of software queries in the embedded code executed by the microcontroller. This allows the code to be compacted, thereby saving storage area and cost. In addition, the present invention achieves a timing advantage in modify operations since the time duration needed to execute the more compact embedded code is reduced, allowing the suspend timing requirements of a flash memory device to be more easily met.

DETAILED DESCRIPTION

The present invention relates to flash memory devices and similar non-volatile electronic devices, and more particularly to suspend requests in flash memory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the processing components and memory usable with the present invention can take a number of different forms. The present invention will also be described in the context of particular methods having certain steps. However, the method and system operate effectively for other methods having different and/or additional steps not inconsistent with the present invention.

The present invention describes an architecture which permits correct and efficient management of suspend requests derived from a user during modify operations, without the use of software queries in the embedded code executed by the microcontroller, thus achieving a timing advantage in modify operations and shorter, more compact code that saves storage area in the flash device's code storage memories, such as a ROM.

To more particularly describe the features of the present invention, please refer to FIGS. 1 through 3 in conjunction with the discussion below.

Figure 1:
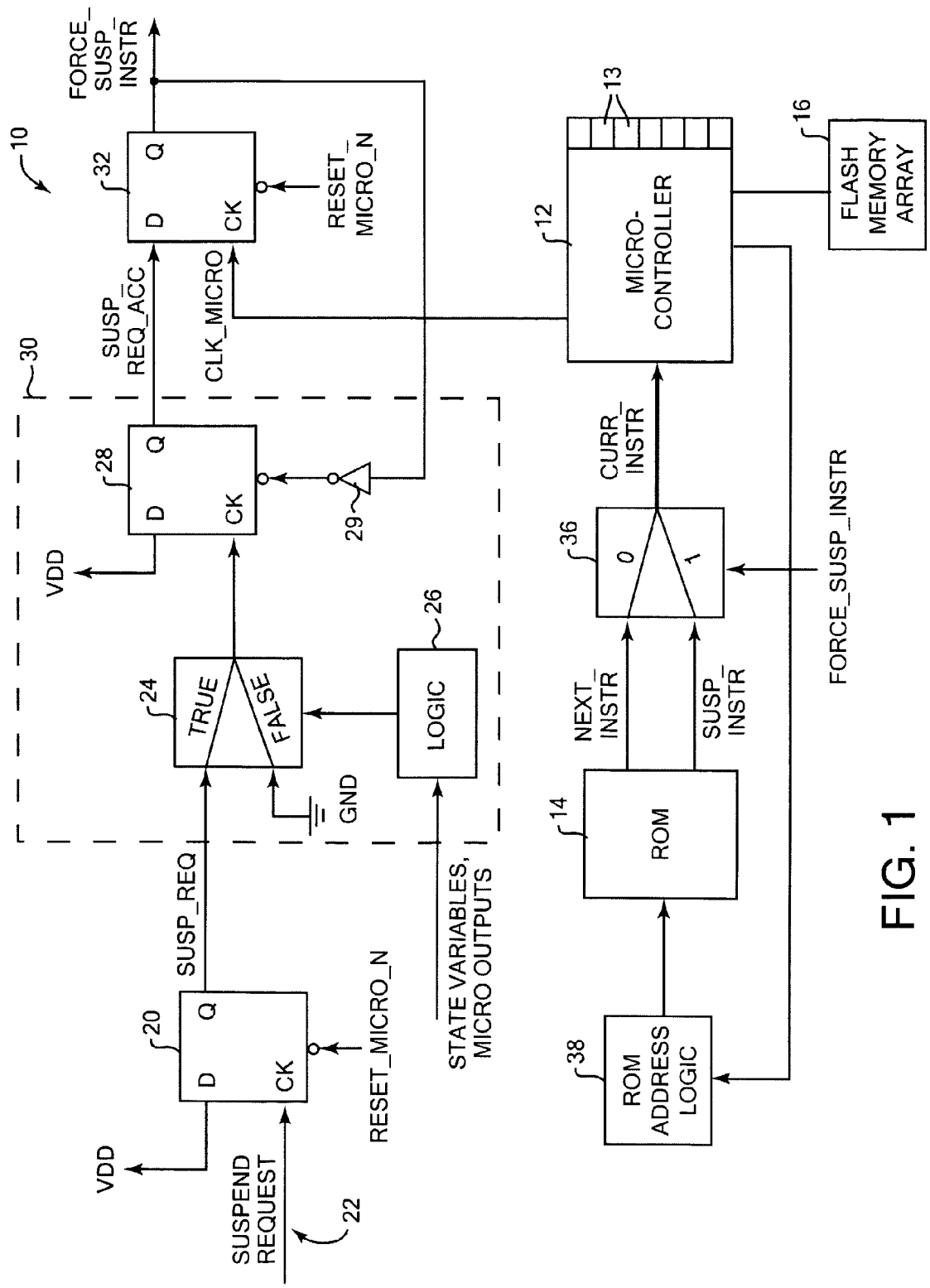
FIG. 1 is a block diagram illustrating a hardware flash memory system of the present invention.

FIG. 1 is a block diagram of a flash memory system 10 of the present invention for managing suspend requests during a modify operation without software queries. System 10 can be included in an electronic apparatus, computer, or other device or apparatus which uses flash memory for storing data. The apparatus can include one or more processors (microprocessors, application specific integrated circuits, etc.), various types of memory, and input/output (I/O) components (network interface, devices such as a keyboard or buttons, display screen, printer, mouse, microphone, scanner, etc.), as is well known. More specific to the present invention, the flash memory system 10 includes a microcontroller 12, read-only memory (ROM) 14, and flash memory array 16, as well as various other components described below.

Microcontroller 12 is provided to control operations of the flash memory system 10, including retrieving code from the ROM 14 and executing it, and to store and retrieve data from the flash memory array 16. The microcontroller 12 can be any of a variety of suitable controller devices, including microprocessors, application specific integrated circuits (ASICs), or other controllers. The microcontroller 12 can include a number of registers 13 which control the parameters of operations of the flash memory system 10 when digital information is loaded and stored therein.

Read-only memory (ROM) 14 stores program instructions (i.e., embedded code) which are used to implement operations that modify or manipulate the flash memory system 10. The ROM 14 stores instructions which are retrieved by the microcontroller 12 and executed to operate the flash memory system. Although memory 14 is referred to as "ROM" throughout this specification, in other embodiments other types of memory can be used as memory 14 to store the embedded code, such as Static Random Access Memory (SRAM) or other well-known types.

Flash memory array 16 is an array of memory cells and is non-volatile memory storage in system 10 that can store data and allows that data to be erased and/or written over with other data multiple times. Typical flash memory cells allow the entire contents of the memory to be quickly erased at one time, as opposed to more general electrically erasable programmable read only memory (EEPROM) that requires each memory cell to be individually erased. Array 16 can include single-level cells or multi-level cells, depending on the desired embodiment. Single-level cells store two different charge values (0 or 1), while multi-level cells can store four or more different charge values, and thus can store more data per cell, but may require longer to perform particular operations.

The remaining hardware components of flash memory system 10 as shown in FIG. 1 are used in the present invention to manage suspend requests from the user. Other components typically included in a flash memory system and not shown in FIG. 1 are not pertinent to the present invention.

Flip-flop 20 is able to receive a suspend request 22 from a user, which is a request to interrupt and halt the execution of a current modify operation so that the flash memory may be accessed for other operations for the user, such as a read operation. The execution of the suspended modify operation is resumed once the user's operations are complete.

The user can enter a suspend request command, for example, using a command user interface (CUI), such as an I/O pad. Flip-flop 20, shown in FIG. 1 as a D-type flip-flop, is provided with a voltage VDD as its D input, and the suspend request 22 as its clock input. The flip-flop 20 latches the suspend request when the suspend request goes high. The flip-flop produces the high output signal SUSP_REQ. The RESET_MICRO_N signal is the reset for flip-flop 20, and is provided by logic (not shown) when the modify operation ends or at the beginning of the next operation or suspend.

Multiplexer 24, logic 26, and flip-flip 28 make up a logical switch 30 to acknowledge the user's suspend request at the appropriate time. Logic 26 checks whether the suspend request signal SUSP_REQ should be allowed through, i.e., whether a suspend of a modify operation should be acknowledged and implemented. The suspension request is acknowledged and becomes operative only when the modify operation (and embedded code) is at a point or state where it can be interrupted, a "true condition." The logic 26 provides a true condition at the appropriate time based on the type of modify operation currently going on (program, erase, etc.), and based on the current instruction being executed by the microcontroller 12. Typically, the true condition is caused based on state variables and microprocessor outputs. One example of logic 26 is described below with reference to FIG. 2.

Until the true condition is detected, the multiplexer 24 selects the FALSE input of multiplexer 24, which is connected to ground. Once the logic 26 detects a true condition that allows the suspend request to be acknowledged, the logic 26 sends the appropriate signal to the multiplexer 24 and the multiplexer 24 switches from the FALSE input to the TRUE input, which is connected to the SUSP_REQ signal of flip-flop 20. The SUSP_REQ signal is output from the multiplexer 24 and is input to the clock input of flip-flop 28. Flip-flop 28 latches the SUSP_REQ signal as SUSP_REQ_ACC and provides that signal as high at its output. Thus, the logical switch 30 including multiplexer 24, logic 26, and flip-flop 28 provides the SUSP_REC_ACC signal as high when the suspend request is acknowledged and a suspension of the modify operation is to be implemented, i.e. a suspend sequence started.

A flip-flop 32 is of the D-type and receives the SUSP_REC_ACC signal at its D input. The clock signal from the microcontroller 12 is provided at the clock input of the flip-flop 32, and the Q output of the flip-flop 32 provides a signal FORCE_SUSP_INSTR. The RESET_MICRO_N signal resets the flip-flop 32, and is provided from the user interface as described above. The FORCE_SUSP_INSTR signal is synchronized with the microcontroller clock signal. This synchronization assures correct functionality of the FORCE_SUSP_INSTR signal, which has two functions. The first function is to reset the flip-flop 28, which is allowed by feeding back the FORCE_SUSP_INSTR signal to the reset of flip-flop 28 (and inverting it at inverter 29). The suspend request has been acknowledged when the FORCE_SUSP_INSTR signal goes high, and this causes the FORCE_ SUSP_INSTR signal to be switched off on the next active clock transition of the microcontroller so that the correct suspense code instructions are read from ROM 14 (see below).

The second function of FORCE_SUSP_INSTR is to switch the input of a multiplexer (or switch) 36 to a fixed instruction SUSP_INSTR stored at a known memory location in ROM 14. The SUSP_INSTR instruction is a jump (JMP) to the first address in ROM 14 which stores the code instructions for a suspend sequence. Thus, in the clock period in which FORCE_SUSP_INSTR goes high, the output of the multiplexer 36 (CURR_INSTR) will be SUSP_INSTR. This output (SUSP_INSTR) is provided to microcontroller 12, where it is decoded by the microcontroller logic and executed so that the pointer to the next code is moved to (jumped to) the address in the ROM 14 indicated by the SUSP_INST. The arithmetic logic unit (ALU) of the microcontroller 12 loads the first counter address at the ROM address logic 38, which outputs the address to ROM 14 to read the instruction at that address, which is the first instruction for the suspend sequence. Thus the SUSP_INST input directs the microcontroller to load the first instruction of the suspend sequence code. Since the FORCE_SUSP_INSTR has been set low by the next microprocessor clock cycle (at flip-flop 28 above), the multiplexer 36 then switches to its other input, NEXT_INSTR, to allow the next instruction in the suspend sequence in the ROM 14 to be provided to the multiplexer 36 and output from the multiplexer to the microcontroller 12. The ROM address logic 38 always provides the address of the next instruction in the suspend sequence to execute.

The sequential instructions of the suspend sequence continue to be similarly provided to microcontroller 12 until all of the instructions in the ROM for the suspend sequence have been loaded and executed by the microcontroller 12. The suspend sequence switches off all the charge pumps (not shown) and high voltages used for running the suspended modify operation, and saves configuration variables and values, such as state variables, and timing values, that will be used when the modify operation is resumed. These configuration variables and values can be stored in convenient storage locations, e.g. registers of logic components not shown.

Once the suspend sequence is completed, the modify operation of the flash device 10 has been fully suspended, and the RESET_MICRO_N signal is provided to the flip-flop 20 to switch off that flip-flop. The user may then have desired operations implemented by the flash memory device, such as read operations from array 16 in a read array mode of the flash system 10.

At some point, when the user's read operations (and/or other operations) are complete, the flash memory device resumes the interrupted modify operation. The microcontroller 12 reads the configuration variables and values that were saved by the suspend sequence, switches on necessary charge pumps and voltages, and resumes the interrupted modify operation.

Figure 2:
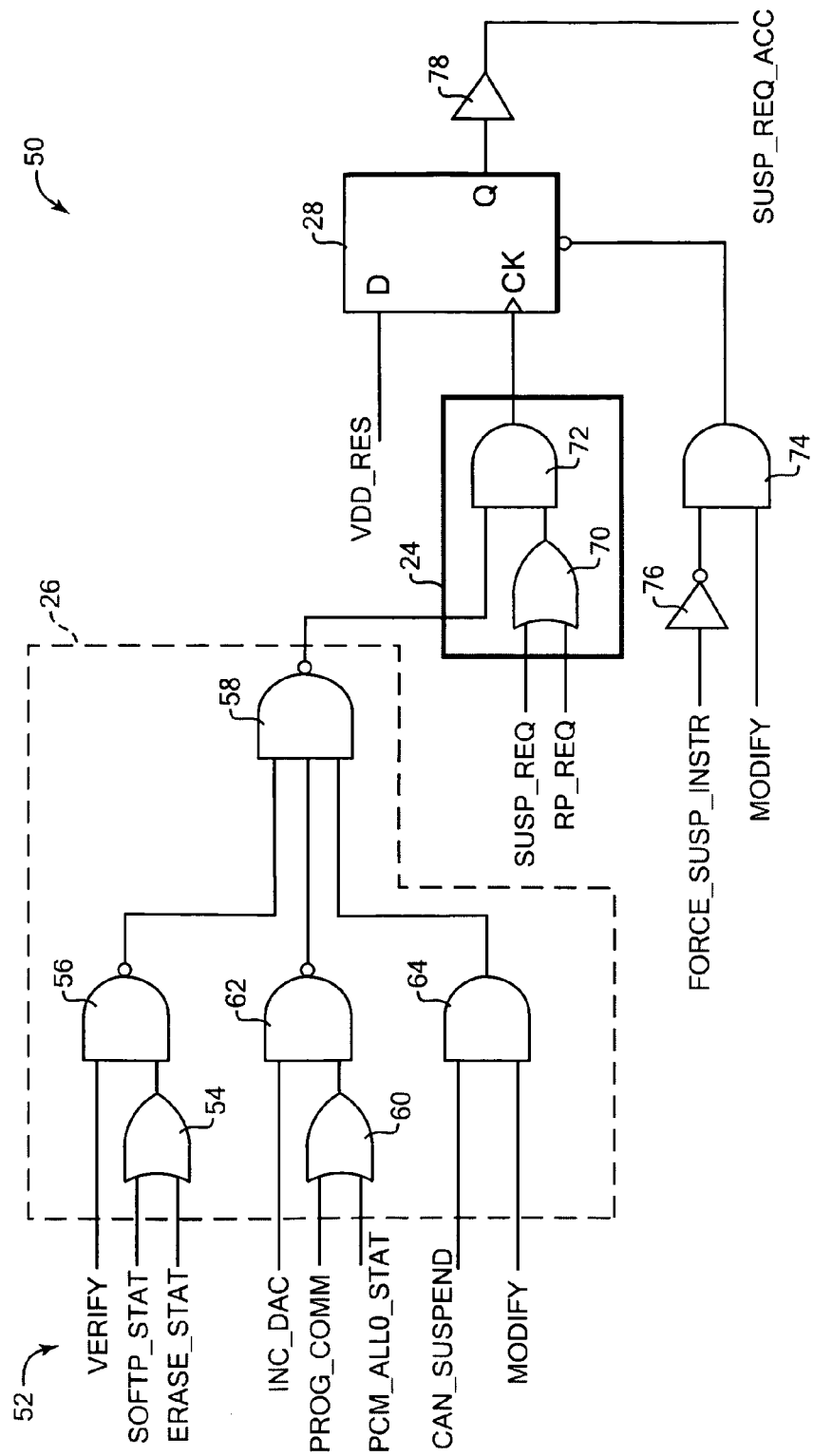
FIG. 2 is a schematic diagram illustrating an example of the logic and some components used in the flash memory system of FIG. 1.

FIG. 2 is a schematic diagram of an example of a circuit 50 that implements the logic 26 of the flash memory device 10 of FIG. 1 and implements some other components shown in FIG. 1. The logic 26 generates a "true condition" for the multiplexer 24 when the conditions are appropriate for the suspend request to be acknowledged and the suspend sequence to be initiated. The true condition is generated and the suspend sequence initiated based on the particular interrupted modify operation and its characteristics and requirements in any particular embodiment, and can be based on the modify operations required by a specific implementation, if a flash memory is single or multi-level, etc. The circuit 50 is an example circuit that is used with a multi-level flash memory device, e.g., a multi-level flash memory available from Atmel Corp. of San Jose, Calif.

Circuit 50 implements logic 26 as several logic gates that process state variables and microcontroller outputs 52. State variables, such as ERASE_STAT, SOFTP_STAT, PROG_COMM, and PGM_ALL0_STAT, are variables set by the microcontroller or by internal logic. For example, ERASE_STAT is a state variable set by the microcontroller that indicates to the circuitry that an erase operation is ongoing. SOFTP_STAT is a state variable set by the microcontroller that indicates that a recovery phase is ongoing. PGM_ALL0_STAT is a state variable set by the microcontroller that indicates that a program phase is ongoing. PROG_COMM is a signal set by the command user interface when the user provides a buffered program command. Microcontroller outputs, such as VERIFY, INC_DAC, CAN_SUSPEND, and MODIFY, are output signals from the microcontroller which are generated based on the embedded code. For example, VERIFY is a microcontroller output that activates and indicates a verify operation for verifying a completed operation, and INC_DAC can be another microcontroller output; for example, in the implementation shown, INC-DAC is a microcontroller output that increments the "DAC" output value to increase voltages generated by a separate digital to analog controller (DAC) when programming or erasing a cell in flash memory array 16. CAN_SUSPEND is a microcontroller output that indicates that a suspend request can be accepted during the current operation, and MODIFY is a command user interface output that indicates that a modify operation has started.

Logic 26 includes an OR gate 54 receiving the SOFTP_STAT and ERASE_STAT signals and providing an output to NAND gate 56, which also receives as an input the VERIFY signal. The output of NAND gate 56 is provided as one input to a 3-input NAND gate 58. Similarly, OR gate 60 receives the PROG_COMM and PGM_ALL0_STAT signals and provides an output to NAND gate 62, which also receives as an input the INC_DAC signal. The output of NAND gate 62 is provided as one input to NAND gate 58. Finally, AND gate 64 is provided inputs from the CAN_SUSPEND and MODIFY signals, and provides its output as one of the inputs to NAND gate 58. The output of NAND gate 58 is sent to multiplexer 24 to indicate the true condition (when the output is high).

Multiplexer 24 is shown in the example of FIG. 2 as including an OR gate 70 that receives the SUSP_REQ signal from flip-flop 20 (of FIG. 1) and a RP_REQ signal (a reset request, e.g., from the user input pad). The OR gate 70 provides its output as one input to AND gate 72, which also receives as its other input the true condition signal from the NAND gate 58 of the logic 26. The output of the AND gate 72 is the output of the multiplexer 24, which is received as the clock input of the flip-flop 28 as described above with reference to FIG. 1. Flip-flop 28 also receives a CDN input from an AND gate 74, which has as its inputs the FORCE_SUSP_INSTR signal that has been inverted by inverter 76, and the MODIFY signal, since this logic 74 need only function during a modify operation. The output of the flip-flop 28 is the SUSP_REQ_ACC signal as described above with reference to FIG. 1, provided after a buffer 78 at the output of the flip-flop 28.

It should be noted that other implementations of logic 26, multiplexer 24, and/or the other logic shown in circuit 50 can be provided in alternate embodiments of the present invention.

Figure 3:
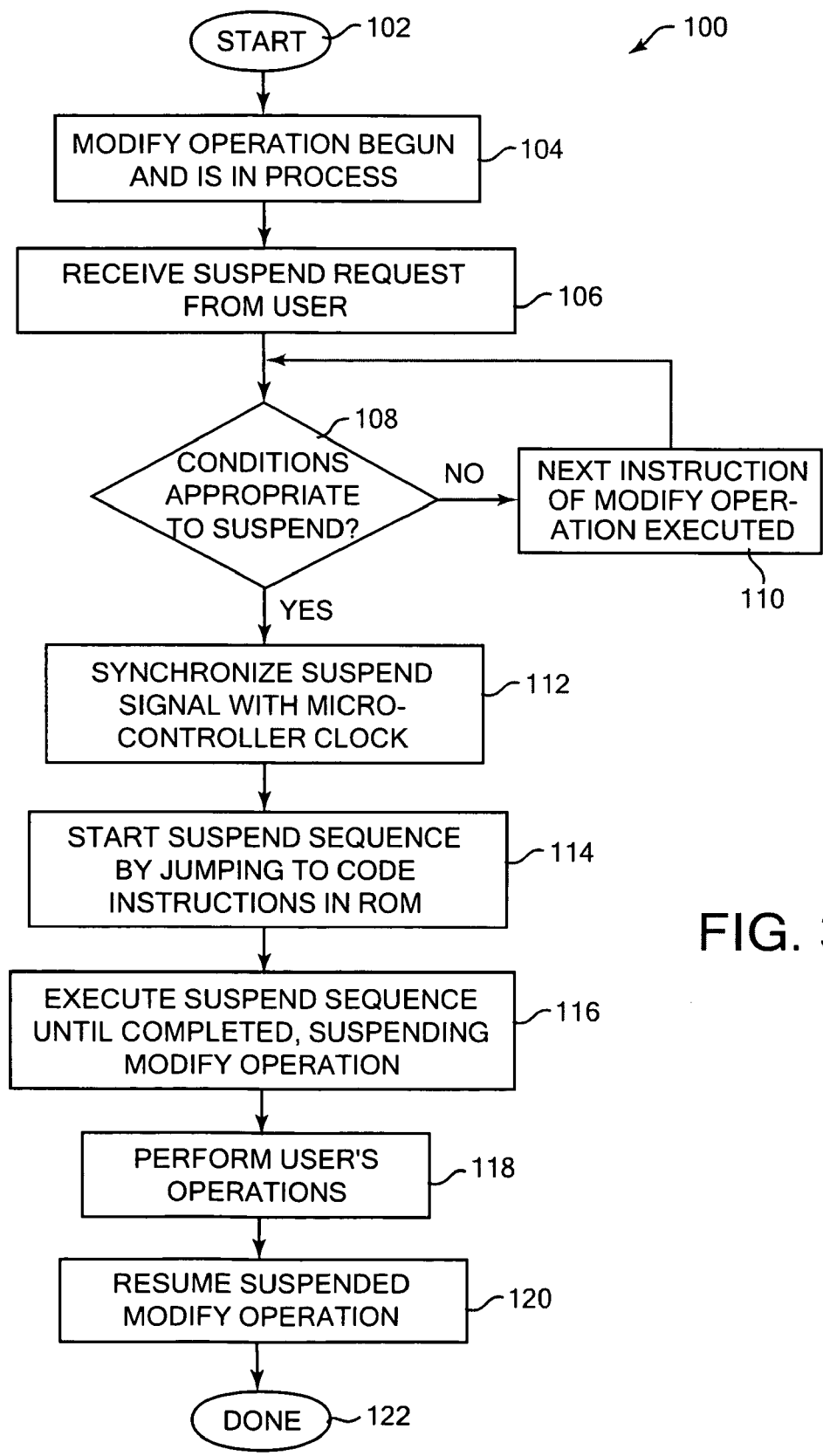
FIG. 3 is a flow diagram illustrating a method of the present invention for managing suspend requests in a flash memory device.

FIG. 3 is a flow diagram illustrating a method 100 of the present invention for managing a suspend sequence for a flash memory. Method 100 is preferably implemented using hardware as well as program instructions or code that can be executed by the microcontroller 12 (or other suitable processor or computer system), and are stored on a computer readable medium, such as memory (ROM 14 or other memory), hard drive, optical disk (CD-ROM, DVD-ROM, etc.), magnetic disk, etc. In the preferred embodiment, particular method steps are implemented in hardware (logic gates, etc.), while other steps, such as implementing the suspend sequence, are preferably implemented using software instructions in ROM 14 and retrieved by the microcontroller 12 to be executed.

The method begins at 102, and in step 104, a modify operation is initiated and is in process. As described above, the modify operation can be a program operation to change or add a new value to the flash memory array 16, an erase operation to erase a value from the array 16, or other operation that modifies the contents of the array.

In step 106, a suspend request 22 is received from the user (or from another source, also referred to as a "user" herein, such as an application program) while the modify operation of step 104 is still ongoing and has not yet completed. As noted above, the suspend request can be input to the flash memory system 10 by the user using a command interface appropriate to the flash memory system. Typically, the user inputs this suspend request as part of a need to perform a read operation with the flash memory system, such as to read memory from flash memory array 16.

In step 108, the method checks whether the conditions are appropriate to suspend the modify operation of step 104. In the present invention, the conditions are appropriate for suspension when the logic 26 generates a "true condition" based on state variables and microcontroller outputs, which are themselves based on whether the currently-executed instruction within the current modify operation is suspendable or interruptible. For example, the current instruction of the modify operation may not be able to be interrupted without causing functionality errors or problems (all referred to simply as "errors" herein); e.g., some types of instructions of the modify operation, when interrupted, may not allow the modify operation to correctly resume. Whether the current instruction can be interrupted or not can be determined from state variables and outputs of the microcontroller, as performed by logic 26 as described above. Thus, if the instruction currently being executed should not be interrupted, no true condition will be generated by the logic 26.

It should be noted that step 108 is not an actual compare operation that is performed on a register or of a flag or other data; rather, this step simply signifies that the process will not proceed to step 112 unless the conditions are appropriate. The present invention has a significant advantage over the prior implementations because the present invention does not have to perform specific compare operations to check register flags to determine when suspension of the modify operation can be implemented, and thus the code instructions can be made much more compact.

If conditions are not appropriate to suspend in step 108, then in step 110 the next instruction in the modify operation is executed, and the process returns to step 108 to again determine whether the conditions are appropriate for suspension. For example, in typical flash memory embedded code, there are a high number of instructions that cannot be interrupted, but these non-interruptible instructions are typically not consecutive in the code, thereby allowing an operation to be suspended during execution of an interruptible instruction that follows the non-interruptible instruction.

Once conditions are appropriate to suspend the modify operation, in step 112 the suspend signal, derived from the user's suspend request, is synchronized with the microcontroller clock. As described with reference to FIG. 1, this can be performed by using flip-flop 32. In next step 114, the suspend sequence is initiated by jumping to the appropriate code instruction sequence stored in the ROM 14. In the example of FIG. 1, this is accomplished by using multiplexer 36, which is switched by the FORCE_SUSP_INSTR signal to allow the microcontroller to jump to the proper suspend code sequence in ROM 14.

In step 116, the suspend sequence is executed until it is completed and the modify operation is suspended. As explained above, this can be accomplished by executing all the suspend code instructions in ROM 14. Any state variables or other characteristics can be saved (e.g., in registers) so that resumption of the modify operation can later occur without error.

With the modify operation suspended, the user's read operations (and/or other desired operations) of the flash memory device 10 can be performed in step 118. Once the user's operations are complete, the suspended modify operation is resumed in step 120, where any save state variables or other data can be retrieved to correctly resume the modify operation. The process is thus complete at 122.

Since the process of the present invention uses an automatic detection of a suspend request and suspension of a modify operation (e.g., using hardware), it does not need to use the software method of the prior art, in which a query (compare instruction) is executed every few lines of code, even if no suspend request has occurred, to determine if a suspend request has been received. In the prior art, a query instruction had to be executed within a minimum time period so that the timing requirements of the flash memory system 10 for suspension of the operation could be met. In the present invention, since these compare instructions do not need to be executed, the timing requirements are more easily met. Furthermore, the embedded code can be greatly compacted in the present invention due to the removal of the compare instructions, thus saving cost in storage area for the code.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for managing a suspend request in a flash memory comprising:
   a microcontroller performing a modify operation on a flash memory array;
   a memory coupled to the microcontroller and storing suspend sequence code for implementing a suspend sequence to cause a suspension of the modify operation when executed by the microcontroller; and
   suspend circuitry coupled to the microcontroller and to the memory, wherein the suspend circuitry receives a suspend request from a user to suspend the modify operation, determines when the execution of the suspend sequence code will not cause errors in the modify operation, and causes the microcontroller to start the execution of the suspend sequence code when the modify operation is able to be suspended without causing errors in the modify operation.

2. The system of claim 1 wherein the suspend circuitry causes the microcontroller to start the execution of the suspend sequence code when the currently-executed instruction of the modify operation is able to be suspended without causing errors in the modify operation.

3. The system of claim 1 wherein the suspend circuitry includes a flip-flop for latching the suspend request before the start of the execution of the suspend sequence code until the suspend request can be implemented without error.

4. The system of claim 1 wherein the suspend circuitry includes a switch and logic, wherein the logic determines when the execution of the suspend sequence code can be started.

5. The system of claim 4 wherein the logic receives state variables and receives outputs from the microcontroller to determine when the execution of the suspend sequence code can be started.

6. The system of claim 1 wherein the suspend circuitry includes at least one flip-flop for providing a signal for starting the execution of the suspend sequence code in accordance with a clock of the microcontroller.

7. The system of claim 1 wherein the suspend circuitry includes a multiplexer for selecting a starting code address for the suspend sequence code when the execution of the suspend sequence code is started, wherein the starting code address references a memory location in the memory.

8. The system of claim 7 wherein the multiplexer selects a next instruction in the suspend sequence code after the microcontroller starts the suspend sequence.

9. The system of claim 8 wherein a signal from a flip-flop sets the multiplexer to select a starting code address, and wherein the flip-flop turns the signal off to set the multiplexer to select the next instructions in the suspend sequence code.

10. The system of claim 1 wherein the memory is a read-only memory (ROM).

11. A method for managing a suspend request in a flash memory comprising:
    receiving a suspend request signal from a user to suspend a modify operation on a flash memory array being performed by a microcontroller;
    latching the suspend request signal until determining that the modify operation can be suspended without causing errors in the modify operation; and
    suspending the modify operation by causing the microcontroller to start executing suspend sequence code stored in a memory in response to determining that the modify operation can be suspended without causing errors in the modify operation.

12. The method of claim 11 wherein the latching of the suspend request signal is performed with a flip-flop.

13. The method of claim 11 wherein the modify operation can be suspended when the modify operation is executing an instruction that can be interrupted.

14. The method of claim 11 wherein hardware logic determines when the modify operation can be suspended based on state variables and outputs from a microcontroller.

15. The method of claim 14 wherein the suspend request signal is allowed to be input to suspend request circuitry by a switch when the modify operation can be suspended, wherein the switch is controlled by the hardware logic.

16. The method of claim 11 wherein suspending the modify operation includes providing the suspend request signal to a switch that directs the microcontroller to the starting address of the suspend sequence code stored in the memory.

17. The method of claim 16 wherein the switch selects a next instruction in the suspend sequence code after the microcontroller starts the execution of the suspend sequence code.

18. The method of claim 17 wherein a signal from a flip-flop sets the switch to select a starting code address, and wherein the flip-flop sets the signal to cause the switch to select the next instructions in the suspend sequence code.

19. The method of claim 11 further comprising receiving signals from the user for implementing at least one user operation while the modify operation is suspended.

20. The method of claim 19 wherein the user operation is a read operation for reading data from the flash memory cells.

21. The method of claim 20 further comprising resuming the modify operation after the at least one user operation is complete.

22. The method of claim 11 wherein the execution of the suspend sequence code is started in accordance with a clock of the microcontroller using at least one flip-flop.

23. A method for managing a suspend request in a flash memory comprising:
  executing embedded software code instructions from a memory using a microcontroller to implement a modify operation on a flash memory array;
  receiving a suspend request from a user to suspend the modify operation;
  latching the suspend request signal until determining that the modify operation can be interrupted without causing errors in the modify operation; and
  suspending the modify operation using hardware suspend circuitry without executing software code instructions that check whether the suspend request was received, by causing the microcontroller to start executing suspend sequence code stored in a memory in response to determining that the modify operation can be interrupted without causing errors in the modify operation.

24. The method of claim 23 wherein suspending the modify operation includes interrupting the execution of an instruction of the modify operation when that instruction is able to be interrupted without causing errors in the modify operation.

25. The method of claim 24 wherein when the currently-executed instruction cannot be interrupted without causing errors in the modify operation, suspending the modify operation includes waiting for and interrupted the next instruction of the modify operation that is able to be interrupted without causing errors in the modify operation.

26. The method of claim 25 wherein hardware logic determines when the modify operation can be interrupted and suspended, based on state variables and outputs from the microcontroller.

27. The method of claim 23 wherein suspending the modify operation includes providing a suspend request signal to a switch that directs the microcontroller to the starting address of the suspend sequence code stored in the memory.

28. The method of claim 27 wherein the switch selects a next instruction in the suspend sequence code after the microcontroller starts the suspend sequence.

29. The method of claim 23 further comprising receiving signals from the user for implementing at least one user operation while the modify operation is suspended.

30. The method of claim 29 further comprising resuming the modify operation after the at least one user operation is complete.

* * * * *